No. 810,765. PATENTED JAN. 23, 1906.
J. JOHENGEN & E. A. FEDICK.
POTATO DIGGER.
APPLICATION FILED DEC. 21, 1904.
2 SHEETS—SHEET 1.
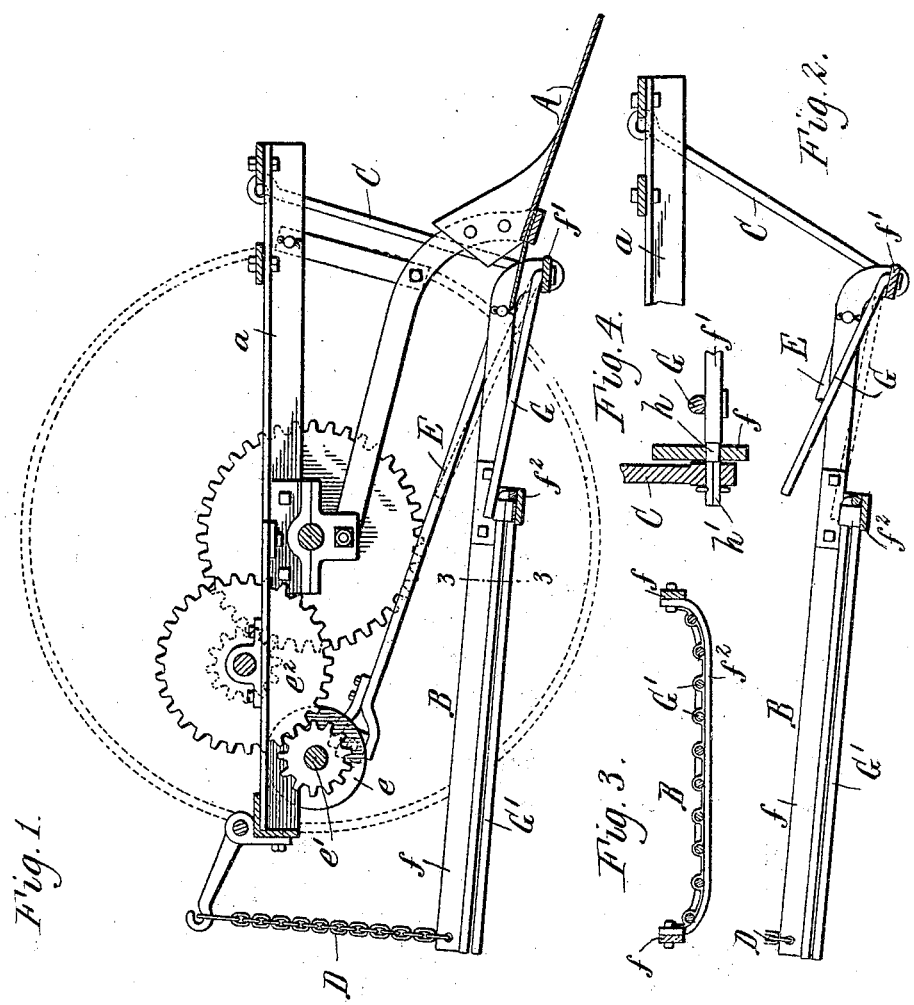

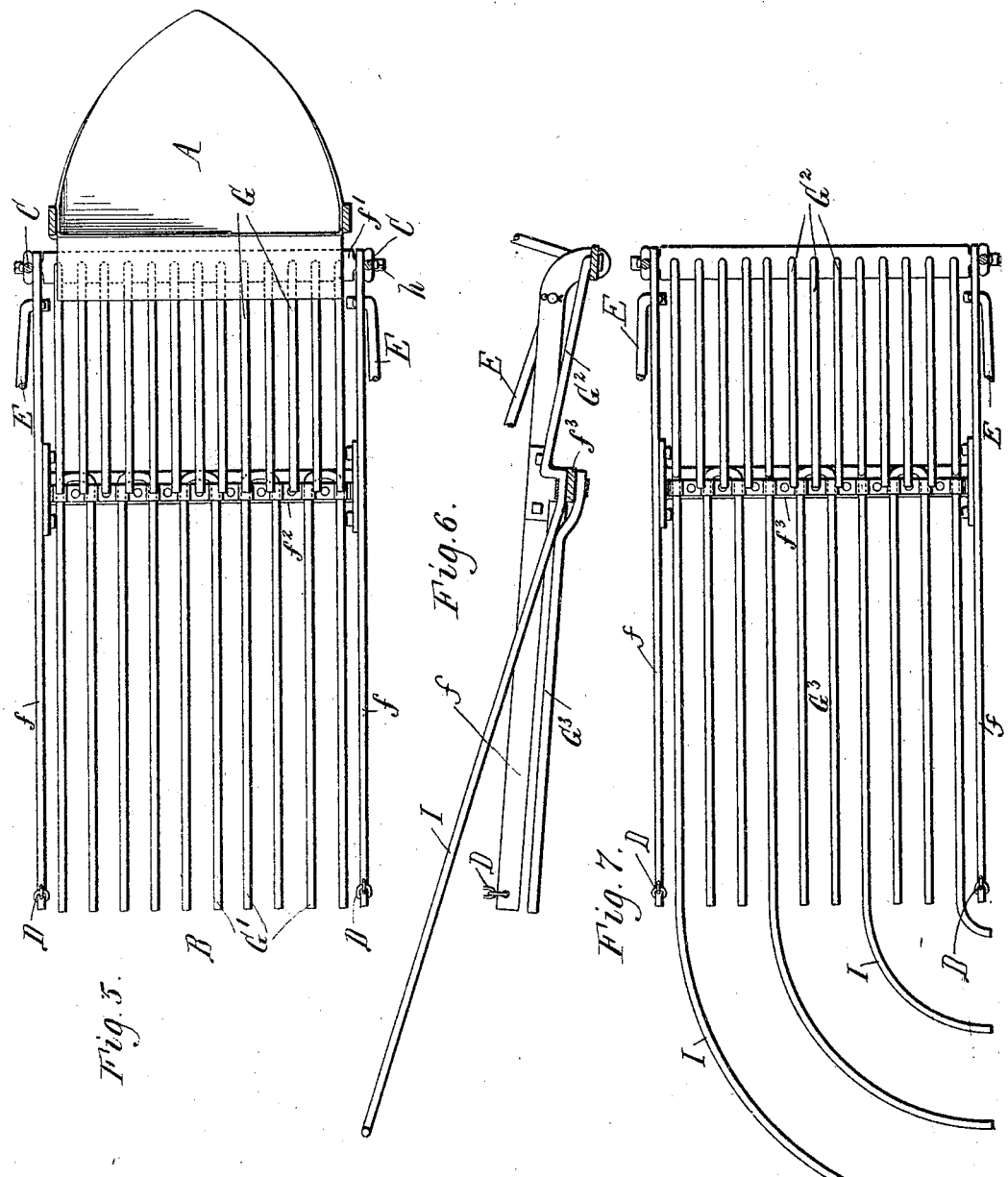

UNITED STATES PATENT OFFICE.

JACOB JOHENGEN AND EDWARD A. FEDICK, OF HAMBURG, NEW YORK.

POTATO-DIGGER.

No. 810,765.   Specification of Letters Patent.   Patented Jan. 23, 1906.

Application filed December 21, 1904. Serial No. 237,759.

*To all whom it may concern:*

Be it known that we, JACOB JOHENGEN and EDWARD A. FEDICK, citizens of the United States, residing at Hamburg, in the county of Erie and State of New York, have invented a new and useful Improvement in Potato-Diggers, of which the following is a specification.

This invention relates to potato-diggers of that kind having a plow or scoop which is drawn through the ground and a vibrating or shaking separator which is arranged in rear of the plow and receives the potatoes, earth, vines, and rubbish from the plow and by its action separates the earth, vines, and rubbish from the potatoes and feeds the potatoes and vines rearwardly, dropping them on the ground over its rear end.

The invention is directed more particularly to improvements in the construction of the vibrating or shaking separator.

One object of the invention is to provide a shaking separator which will operate efficiently to separate the potatoes from the earth and rubbish with the minimum draft in either light, loose, or sandy soil or in heavy, wet, or clayey soil.

Another object of the invention is to provide a separator of simple and strong construction having provision for holding the vines up off of the separating-surface, whereby a more ready separation of the potatoes and earth is effected.

In the accompanying drawings, consisting of two sheets, Figure 1 is a longitudinal sectional elevation of a portion of a potato-digger provided with a separator embodying the invention. Fig. 2 is a similar view of the separator, showing it in a different position. Fig. 3 is a transverse sectional elevation of the separator. Fig. 4 is a detail sectional elevation, on an enlarged scale, showing the manner of connecting the front end of the separator and its swinging supporting-links. Fig. 5 is a plan view, partly in section, of the separator and plow. Fig. 6 is a longitudinal sectional elevation of a separator provided with vine-holding fingers. Fig. 7 is a plan view, partly in section, of the separator shown in Fig. 6.

Like letters of reference refer to like parts in the several figures.

A represents the plow or scoop, which is supported in any usual or suitable manner from the main frame $a$ of the machine, and B represents the separator, which is arranged in rear of the plow in position to receive the potatoes, earth, vines, and rubbish therefrom. The separator is hung from the main frame on swinging links C, located at opposite sides of its front end, and chains D, located at opposite sides of its rear end. The separator may be movably supported by any other suitable means. The separator is shaken or vibrated by suitable means, such as pitmen E, connecting opposite sides of its front end with crank-wheels $e$ on a shaft $e'$, which is journaled in the main frame and is driven from the ground-wheels of the machine by suitable gearing $e^2$. Only one of the crank-wheels is shown in the drawings. The separator comprises a frame having longitudinal side bars $f$, connected by cross-bars $f'\ f^2$, located, respectively, at the front end and intermediate portions of the separator-frame, and front and rear sets of longitudinal spaced tines or separating-bars, shown at G G', respectively. The front tines are rigidly attached at their front ends in any desired manner to the front cross-bar $f'$ of the separator and terminate at their rear ends over and some little distance above the front ends of the rear tines. The rear tines are spaced farther apart than the front tines and are rigidly attached at their front ends in any suitable manner to the intermediate cross-bar $f^2$ of the separator. Preferably the front cross-bar of the separator is mounted to rock on the side bars of the separator-frame and is fixed to the lower ends of the swinging links C, so that as the separator is moved back and forth by its operating mechanism the front cross-bar is rocked and the front tines G, which are fixed thereto, are vibrated up and down, as indicated by the full and dotted lines in Figs. 1 and 2. In the construction shown this is accomplished by providing the ends of the front cross-bar with journals $h$, which bear and turn freely in holes in the side bars of the separator-frame and have square ends $h'$ fitted in correspondingly-shaped holes in the lower ends of the swinging links. (See Fig. 4.)

The operation of the separator is as follows: It is constantly reciprocated or vibrated toward and from the plow and agitates and works rearwardly the earth, vines, and potatoes which it receives from the plow. If the digger is operating in loose, fine, or sandy soil, the complete or nearly complete separation is effected by the relatively close front tines G, the soil falling through between the tines, while the potatoes, vines, and rubbish pass rearwardly and drop onto the rear tines G', from which the potatoes are dropped either between the tines or over their rear ends, depending on the size of the potatoes on top of the loosened ground. Little power is required to operate a separator thus constructed, because the separation is nearly completed on the short front tines G, and the more widely spaced rear tines G' permit the small potatoes, stones, and soil which were not separated by the front tines to fall between them, thereby greatly reducing the weight of material on the separator. In working in wet and clayey ground the front tines G only separate the small loose particles of soil from the potatoes; but the clods and lumps of soil are broken up as they fall with the potatoes from the front tines onto the rear tines G', and the latter then act to thoroughly separate all of the soil from the potatoes. The up and down vibration of the front tines also materially aids in breaking up the heavy soil and lumps, and so prepares the material for ready separation by the rear tines.

The separator described is strong and rigid, as the tines are relatively short, while the separating-surface as a whole is of considerable length. Where long tines are fixed only at their front ends, their rear ends are liable to spring and vibrate to a degree detrimental to efficient separation, and it is not ordinarily feasible to brace the tines between their ends by a cross-bar, as the vines and weeds will catch on the cross-bar and interfere with the rearward movement of the material on the separator. In the construction herein disclosed, however, the rear ends of the front tines are elevated sufficiently above the intermediate bar $f^2$ to allow the vines and weeds to pass over the latter without catching.

In the separator shown in Figs. 6 and 7 the relative arrangement of the front and rear sets of tines $G^2$ and $G^3$ is similar to that in the separator above described, except that the front cross-bar and tines do not rock or oscillate vertically, but are held stationary on the shaking separator-frame. The separator shown in these Figs. 6 and 7 is also provided with vine-holding fingers I for holding the vines, weeds, and the like up off of the separating-surface and delivering the same to one side of the machine, where they will not cover and hide the potatoes which have been separated and dropped on the ground. To form the vine-holding fingers, certain of the front tines $G^2$—for instance, every third one—are bent downwardly at the intermediate cross-bar $f^3$, to which they are fixed by suitable securing means and are continued rearwardly from said intermediate cross-bar, being bent upwardly and preferably having their rear ends deflected or turned laterally. These vine-holding fingers I hold the vines and weeds up off of the rear tines, so as not to interfere with the separation of the potatoes from the soil and deliver the vines and weeds to one side of the machine.

The separator shown in Figs. 1 to 5 could also have vine-fingers secured to its fixed cross-bar.

We claim as our invention—

1. A shaking separator for potato-diggers provided with longitudinal spaced separating-tines arranged in two sets, one in advance of the other, the tines of the front set being arranged nearer together than those of the rear set and having their rear ends elevated above the front ends of the rear tines, substantially as set forth.

2. A shaking separator for potato-diggers comprising a single rigid frame, and longitudinal spaced separating-tines supported by said frame and arranged in two sets, one in advance of the other, the tines of the front set being arranged nearer together than those of the rear set and having their ends elevated above the front ends of the rear tines, substantially as set forth.

3. In a potato-digger, a shaking separator comprising longitudinal spaced separating-tines arranged in two sets, one in advance of the other, the tines of the rear set being spaced farther apart than those of the front set and extending forwardly beneath the rear ends of the front tines, a single rigid frame supporting both sets of separating-tines, and means for shaking said frame, substantially as set forth.

4. The combination of a separator for potato-diggers having longitudinal spaced separating-tines arranged in two sets, one in advance of the other, the tines of the rear set being fixed to said separator, means for vibrating said separator, and means for rocking said front set of tines in addition to their movement with the separator, substantially as set forth.

5. In a potato-digger, the combination of a rigid frame having a front cross-bar and a cross-bar intermediate of its ends, a set of longitudinal spaced separating-tines secured to and extending rearwardly from each cross-bar, the tines of the front set being spaced nearer together than those of the rear set and having their front ends elevated above the front ends of the rear tines, and means for shaking said separator in a forward and rearward direction, substantially as set forth.

6. The combination of a separator for potato-diggers having longitudinal spaced separating-tines arranged in two sets, one in advance of the other, the tines of said rear set being fixed to said separator and spaced farther apart than the tines of the front set, means for vibrating said separator, and means for rocking said front set of tines in addition to their movement with the separator, substantially as set forth.

7. The combination of a separator-frame, longitudinal spaced separating-tines carried thereby and arranged in two sets, one in advance of the other, the tines of the rear set being fixed to the separator-frame and the tines of the front set being mounted thereon to oscillate vertically, means for vibrating said separator, and means for oscillating said front set of tines, substantially as set forth.

8. The combination of a separator-frame having a fixed bar and a rocking cross-bar adjacent to its front end, longitudinal separating-tines secured to said fixed cross-bar, longitudinal separating-tines secured to said rocking cross-bar, means for vibrating said separator-frame, and means for rocking said front cross-bar, substantially as set forth.

9. The combination of a separator-frame having a fixed cross-bar and a front cross-bar journaled to rock on said frame, longitudinal separating-tines secured to said fixed and rocking cross-bars, swinging supporting-links for said separator-frame fixed to said front cross-bar, and means for vibrating said separator, whereby said front cross-bar is rocked on said frame, substantially as set forth.

Witness our hands this 16th day of December, 1904.

JACOB JOHENGEN.
EDWARD A. FEDICK.

Witnesses:
CHAS. W. PARKER,
EDWARD C. HAIG.